United States Patent Office 3,657,277
Patented Apr. 18, 1972

3,657,277
SUBSTITUTED 1,3-DIOXOLANES
Lars-Olof Ryrfors, Perstorp, Sweden, assignor to
Perstorp AB, Perstorp, Sweden
No Drawing. Filed Sept. 16, 1970, Ser. No. 72,808
Claims priority, application Sweden, Oct. 2, 1969,
13,610/69
Int. Cl. C07d 13/04
U.S. Cl. 260—340.9                                    1 Claim

ABSTRACT OF THE DISCLOSURE

A new compound is disclosed which is 4-ethoxycarbonyl-1,3-dioxolane having the following formula:

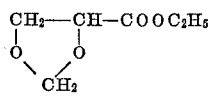

It is useful in making polymers.

---

The present invention relates to new, substituted 1,3-dioxolanes intended to be used as components in polymers and having the formula

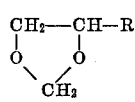

where R=CH$_2$CH$_2$CH$_2$OCOCH$_3$ or COOC$_2$H$_5$.

At the production of the new, substituted 1,3-dioxolanes, 4 - (3 - acetoxypropyl) - 1,3-dioxolane and ethoxycarbonyl - 1,3 - dioxolane according to the invention, pentane-1,2-5-triol and glyceric acid ethyl ester respectively are used as a starting material. Said starting material is reacted with formaldehyde or a formaldehyde dissipating compound, such as paraformaldehyde, by heating to boiling in a solvent in the presence of an acid catalyst. Then, a dioxolane ring is obtained by help of the OH-groups in 1,2-position in the starting compound. In order to get 4-(3-acetoxypropyl)-1,3-dioxolane another reaction step is necessary to modify the substituent on the dioxolane ring obtained.

Benzene is a suitable solvent, but other organic solvents, such as cyclohexane, toluene, chloroform and hexane can be used.

The acid catalyst is suitably paratoluenesulfonic acid, but other acids, e.g. H$_2$SO$_4$, HCl, H$_3$PO$_4$ and an acid ion exchanger, can also be used.

The invention is explained more in detail in connection with the embodiment examples given below.

EXAMPLE 1

Production of 4-(3-acetoxypropyl)-1,3-dioxolane

Reaction steps

HO—CH$_2$—CH—CH$_2$—CH$_2$—CH$_2$—OH ——→
      |
      OH pentane-1,2,5-triol

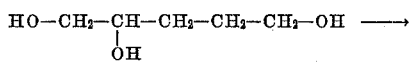

4-(3-propanol)-1,3-dioxolane

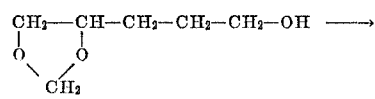

4-(3-acetoxypropyl)-1,3-dioxolane 120 g. (1 mole) pentane-1,2,5-triol, 33 g. (1 mole) 92 percent paraformaldehyde and 19 g. (0.1 mole) p-toluenesulfonic acid were mixed with 1500 ml. benzene and reflux boiled under water trap for 2 hours. The benzene phase was neutralized and evaporated. The remaining oil was distilled and gave 42 g. 4-(3-propanol)-1,3-dioxolane having a boiling point of 80–82° C. at a pressure of 1 mm. Hg. The yield was 32 percent of the theoretical one.

66 g. (0.5 mole) 4 - (3-propanol)-1,3-dioxolane were dissolved in 71.4 g. (0.7 mole) acetic anhydride and 7.8 g. (0.1 mole) pyridine and heated to 70° C. for 60 minutes. Then, the solution was evaporated. The remaining oil was distilled and resulted in 80 g. 4-(3-acetoxypropyl)-1,3-dioxolane having a boiling point of 50° C. at a pressure of 0.02 mm. Hg. The yield was 92 percent of the theoretical one.

EXAMPLE 2

Production of 4-ethoxycarbonyl-1,3-dioxolane

Reaction step

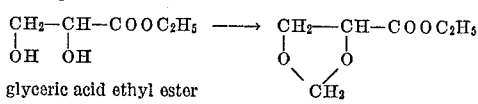

glyceric acid ethyl ester          4-ethoxycarbonyl-1,3-dioxolane 74 g. (0.6 mole) glyceric acid ethyl ester, 21.4 g. (0.6 mole) 84 percent paraformaldehyde, 6 g. (0.03 mole) p-toluenesulfonic acid and 100 ml. benzene were mixed and reflux boiled under water trap, until no more water escaped. The benzene phase was neutralized with Ha$_2$CO$_3$ and evaporated. The remaining oil was distilled and gave 70 g. of 4-ethoxycarbonyl-1,3-dioxolane having a boiling point of 85–89° C. at a pressure of 3 mm. Hg. The yield was 86 percent of the theoretical one.

The substituted 1,3-dioxolanes according to the invention can be homopolymerized, copolymerized, block polymerized and graft polymerized. The comonomers which can be cationically polymerized are especially suitable, e.g. cyclic formals and cyclic ethers. Then, for example polyoxymethylenes and polyethylene oxides can be obtained. By graft polymerization or block polymerization, a large number of combinations with other materials can be obtained.

What is claimed is:

1. A substituted 1,3-dioxolane characterized by the following formula:

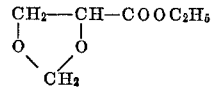

References Cited

"Chemical Abstracts," vol. 70, 1969, col. 37213f, (abstract of French Patent No. 502,385, Nov. 18, 1967).

ALEX MAZEL, Primary Examiner

J. H. TURNIPSEED, Assistant Examiner

U.S. Cl. X.R.

260—88.3, 823